United States Patent
Chen

(10) Patent No.: US 11,367,411 B2
(45) Date of Patent: Jun. 21, 2022

(54) DETECTION OF BLINK PERIOD FOR AMBIENT LIGHT SENSING

(71) Applicant: Google LLC, Mountain View, CA (US)

(72) Inventor: Kuan-Lin Chen, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 33 days.

(21) Appl. No.: 16/965,070

(22) PCT Filed: Aug. 1, 2019

(86) PCT No.: PCT/US2019/044581
§ 371 (c)(1),
(2) Date: Jul. 27, 2020

(87) PCT Pub. No.: WO2021/021207
PCT Pub. Date: Feb. 4, 2021

(65) Prior Publication Data
US 2021/0343257 A1 Nov. 4, 2021

(51) Int. Cl.
*G09G 5/10* (2006.01)
*G01J 1/42* (2006.01)
*G01J 1/44* (2006.01)

(52) U.S. Cl.
CPC .............. *G09G 5/10* (2013.01); *G01J 1/4204* (2013.01); *G01J 1/44* (2013.01);
(Continued)

(58) Field of Classification Search
CPC .............. G09G 5/10; G09G 2320/0626; G09G 2360/144; G09G 2360/14;
(Continued)

(56) References Cited

U.S. PATENT DOCUMENTS 9,488,521 B2 * 11/2016 Maeda .................... G06F 3/042
2007/0211013 A1 9/2007 Uehara et al.
(Continued)

FOREIGN PATENT DOCUMENTS

JP 2010003455 1/2010

OTHER PUBLICATIONS

PCT International Search Report and Written Opinion in International Appln. No. PCT/US2019/044581, dated Apr. 8, 2020, 37 pages.

(Continued)

*Primary Examiner* — Rodney Amadiz
(74) *Attorney, Agent, or Firm* — Fish & Richardson P.C.

(57) ABSTRACT

Detecting ambient light incident on a display includes: detecting incident light at a first photosensor; producing, at the first photosensor, a first measurement signal in response to detecting the incident light at the first photosensor; transmitting the first measurement signal to blink detection circuitry; deriving, at the blink detection circuitry, a blink rate signal from the first measurement signal, in which the blink rate signal is indicative of both an on-period during which light is emitted by a display and an off-period during which light is not emitted by the display; transmitting the blink rate signal to a second photosensor; and detecting incident light at the second photosensor during the off-period of the blink rate signal.

18 Claims, 3 Drawing Sheets

(52) U.S. Cl.
    CPC .............. *G01J 2001/4466* (2013.01); *G09G 2320/0626* (2013.01); *G09G 2360/144* (2013.01)

(58) Field of Classification Search
    CPC .. G09G 2360/141; G09G 3/20; G09G 3/3406; G01J 1/4204; G01J 1/44; G01J 2001/4466; G01J 1/36; G01J 1/4228
    See application file for complete search history.

(56) References Cited

U.S. PATENT DOCUMENTS

| | | | |
|---|---|---|---|
| 2007/0268241 A1* | 11/2007 | Nitta | G09G 3/3406 345/102 |
| 2009/0141332 A1 | 6/2009 | Futatsuya et al. | |
| 2012/0235967 A1 | 9/2012 | Katoh et al. | |
| 2013/0057528 A1* | 3/2013 | Tanaka | G06F 3/0412 345/207 |
| 2013/0278147 A1* | 10/2013 | Vetsuypens | G09G 5/10 315/151 |

OTHER PUBLICATIONS

PCT International Preliminary Report on Patentability in International Appln No. PCT/US2019/044581, dated Feb. 10, 2022, 9 pages.

\* cited by examiner

DETECTION OF BLINK PERIOD FOR AMBIENT LIGHT SENSING

CROSS-REFERENCE TO RELATED APPLICATION

This application is a National Stage Application under 35 U.S.C. § 371 and claims the benefit of International Application No. PCT/US2019/044581, filed Aug. 1, 2019. The disclosure of the foregoing application is hereby incorporated by reference in its entirety.

TECHNICAL FIELD

The present disclosure relates to detection of a blink period for ambient light sensing.

BACKGROUND

Ambient light sensors measure ambient incident light on a display and provide information about the ambient light to a processor that appropriately dims or brightens the light output of the display in response.

SUMMARY

As displays on smart devices move towards bezel-less configurations, there is little to no room to locate an ambient light sensor at a bezel. An alternative option is to place the ambient light sensor under the display, e.g., behind the light emitting elements and the glass or plastic surface that covers the light emitting elements of the display. However, when the display is operated, the ambient light sensor may be overwhelmed by the light emitted from the display (e.g., from reflections from the display surface) such that an accurate measure of ambient light is difficult to obtain.

In general, in certain aspects, the present disclosure covers an ambient light sensing technique in which an off-period of the display, during which the display does not emit light, is detected. Then, based on knowledge of this off-period, also referred to as a blink period or blank period, the ambient light sensor is operated. In a particular implementation, detection of the off-period may be accomplished using a first photosensor that detects incident light during operation of the display and outputs a first measurement signal in response. The first measurement signal then is analyzed using blink detection circuitry that determines the time during which the off-period occurs. The blink detection circuitry then outputs information about the off-period to a second photosensor. Using the information about the off-period derived from the blink detection circuitry, the second photosensor measures light only during the off-period of the display. Since no light is emitted by the display during this time, the second photosensor is able to more accurately measure ambient light levels.

The first photosensor may be configured to be a relatively high speed photosensor that can measure changes in light of the display with good fidelity. For example, the first photosensor may be configured to sample incident light at a rate of at least 10 times the rate of the frame rate of the display. For instance, the first photosensor may be configured to sample incident light at a rate of at least 1 kHz, or at least 4 kHz.

In some implementations, the blink detection circuit may include a comparator that determines the off-period of the display by comparing the first measurement signal to a first threshold value. If the first measurement signal falls below the first threshold value, then the blink detection circuit may output a signal that is indicative of the active elements of the display being in the off-state (e.g., a state in which the active elements are not emitting light).

In some implementations, the blink detection circuit may include a slope detection circuit that determines a slope of the first measurement signal. If the slope is increasing at a rate above some threshold value, the slope detection circuit may determine that the display is turning on, whereas if the slope is decreasing at a rate above some threshold value, the slope detection circuit may determine that the display is turning off. Using this information, the slope detection circuit may output a signal that is indicative of the active elements of the display being in the off-state.

In general, in some aspects, the subject matter of the present disclosure is encompassed by devices that include: a first photosensor configured to produce a first measurement signal in response to detecting incident light at the first photosensor; blink detection circuitry configured to receive the first measurement signal from the first photosensor and to derive, from the first measurement signal, a blink rate signal indicative of both an on-period during which light is emitted by a display and an off-period during which light is not emitted by the display; and a second photosensor configured to receive the blink rate from the measurement signal and to detect incident light on the second photosensor during the off-period of the blink rate signal.

Implementations of the devices may include one or more of the following features. For example, in some implementations, the first photosensor is configured to sample incident light at a frequency of greater than at least 10 times a frame rate of the display. The first photosensor may be configured to sample incident light at a frequency of greater than 1 KHz. The first photosensor may be configured to sample incident light at a frequency of greater than 4 KHz.

In some implementations, the blink detection circuitry includes a comparator circuit, in which the comparator is configured to compare the first measurement signal to a first threshold value and output the blink rate signal based on the comparison of the first measurement signal to the first threshold value.

In some implementations, the blink detection circuitry includes a slope detection circuit configured to: determine a slope of the first measurement signal; and output the blink rate signal based on the slope of the first measurement signal.

In some implementations, the second photosensor is configured to: produce a second measurement signal in response to incident light detected at the second photosensor; and transmit the second measurement signal to a processor of the display. The device may include the processor, in which the processor is configured to alter a brightness of the display in response to the second measurement signal.

In some implementations, the incident light detected at the second photosensor includes ambient light to the display.

In general, in some aspects, the subject matter of the present disclosure is directed to methods of detecting ambient light incident on a display, the methods including: detecting incident light at a first photosensor; producing, at the first photosensor, a first measurement signal in response to detecting the incident light at the first photosensor; transmitting the first measurement signal to blink detection circuitry; deriving, at the blink detection circuitry, a blink rate signal from the first measurement signal, in which the blink rate signal is indicative of both an on-period during which light is emitted by a display and an off-period during which light is not emitted by the display; transmitting the blink rate signal to a second photosensor; and detecting incident light at the second photosensor during the off-period of the blink rate signal.

Implementations of the methods may include one or more of the following features. For example, in some implementations, detecting incident light at the first photosensor includes sampling the incident light at a frequency of at least 10 times a frame rate of the display. Detecting incident light at the first photosensor may include sampling the incident light at a frequency of greater than 1 KHz. Detecting incident light at the first photosensor may include sampling the incident light at a frequency of greater than 4 KHz.

In some implementations, deriving the blink rate signal includes: comparing the first measurement signal to a first threshold value; and outputting the blink rate signal based on the comparison of the first measurement signal to the first threshold value.

In some implementations, deriving the blink rate signal includes: determining a slope of the first measurement signal; and outputting the blink rate signal based on the slope of the first measurement signal.

In some implementations, the methods further include: producing a second measurement signal in response to incident light detected at the second photosensor; and transmitting the second measurement signal to a processor of the display. The methods may further include altering, by the processor, a brightness of the display in response to the second measurement signal.

In some implementations, the incident light detected at the second photosensor includes ambient light to the display.

Implementations of the subject matter disclosed herein may have one or more advantages. For example, in some implementations, the techniques and devices disclosed herein allow a more accurate detection of a blink period during which a light emitting element of a display is turned off. Using the more accurate information about the blink period then may be used to obtain more accurate ambient light signals, since an ambient light detector can be turned on more precisely when the light emitting elements are off, allowing for cleaner and more accurate ambient light signals to be measured. Additionally, the techniques and devices disclosed herein do not rely on pre-existing knowledge of a frame rate of a display in order to measure the ambient light signal. Accordingly, even if the frame rate is adjusted, the devices and techniques disclosed herein can accurately respond to the change in frame rate without substantial delay.

The details of one or more embodiments are set forth in the accompanying drawings and the description below. Other features and advantages will be apparent from the description, drawings, and claims.

DETAILED DESCRIPTION

In general, in certain aspects, the present disclosure covers an ambient light sensing technique in which an off-period of the display, during which the display does not emit light, is detected. Then, based on knowledge of this off-period, also referred to as a blink period or blank period, the ambient light sensor is operated. In a particular implementation, detection of the off-period may be accomplished using a first photosensor that detects incident light during operation of the display and outputs a first measurement signal in response. The first measurement signal then is analyzed using blink detection circuitry that determines the time during which the off-period occurs. The blink detection circuitry then outputs information about the off-period to a second photosensor. Using the information about the off-period derived from the blink detection circuitry, the second photosensor measures light only during the off-period of the display. Since no light is emitted by the display during this time, the second photosensor is able to more accurately measure ambient light levels.

Figure 1:
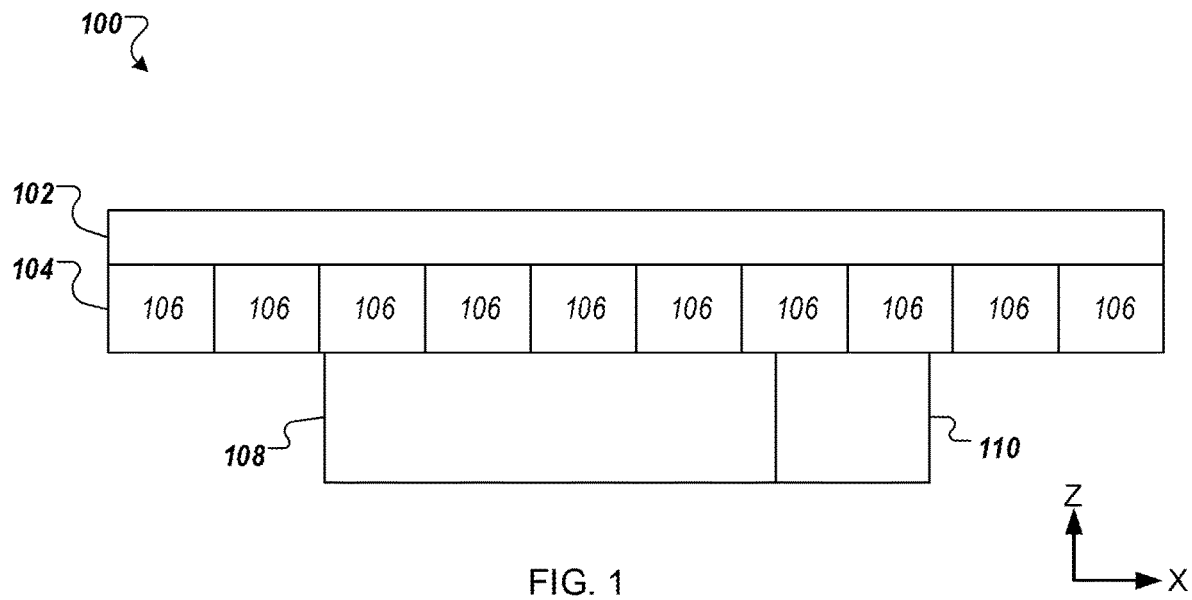
FIG. 1 is a schematic that illustrates a cross-section of an exemplary display.

FIG. 1 is a schematic that illustrates a cross-section of an exemplary display device 100. The display device 100 may be a part of a smart device, such as a smart phone or smart tablet. The display device 100 includes a front panel 102 formed of a material transparent to light emitted by the light emitting elements of the device 100. For instance, the front panel 102 may include a transparent polymer such as trifluoroethylene. The front panel 102 is secured to a back panel region that includes a layer 104 beneath and parallel with the front panel 102. The pixel elements 106 of the display device 100 are provided in layer 104. The pixel elements may be arranged in a two-dimensional array (e.g., along the X-axis direction in FIG. 1 and into/out of the page of FIG. 1 along the Y-axis direction). Each pixel element 106 may include a light emitting element such as a light emitting diode. In particular, a light emitting element may include, e.g., an organic light emitting diode (OLED), and may be formulated to emit light within an appropriate wavelength band (e.g., red, green, or blue light, or cyan, magenta, or yellow light) toward a front surface of panel 102 (e.g., the upper surface of panel 102 shown in FIG. 1). Pixels also may include pixel driver elements that have circuitry required to drive the light emitting elements. The circuitry of a pixel driver element may include suitable hardware such as switches (e.g., thin film transistors), logic circuitry, capacitors, current driving circuitry, and the like that control the delivery of electrical current to each light emitting element. Together with a corresponding light emitting element, each pixel driver elements may form a corresponding pixel 106 of the display device 100. For each pixel 106, the pixel driver elements may be positioned directly beneath the corresponding light emitting element of the pixel. A lower substrate (not shown) provides mechanical support and protection for the light emitting elements and the pixel driver elements and can include, e.g., a transparent polymer such as poly-ethyl terephthalate, and can support one or more additional layers, such as a polyimide layer.

The display device 100 also includes a first photosensor 108 configured to produce a first measurement signal in response to detecting incident light at the first photosensor 108. The first photosensor 108 may be positioned within the display 100 behind the front panel 102, such as behind both the front panel 102 and the pixel layer 104, so that it is located in a region to receive and detect light emitted from the light emitting elements 106 and reflected by the display panel. The first photosensor 108 may include a photosensor configured for high speed operation. In some implementations, the first photosensor 108 includes, e.g., a single-photon avalanche photodiode. The first photosensor 108 is configured to sample incident light at a frequency of greater than at least 10 times a frame rate of the display, at least 20 times a frame rate of the display, at least 30 times a frame rate of the display, at least 40 times a frame rate of the display, or at least 50 times a frame rate of the display, among other sampling rates. For example, the frame rate of the display may be 30 frames per second (fps), 60 fps, 90 fps, or 120 fps, among other frame rates. Accordingly, the first photosensor 108 may be configured to sample incident light at rates of, e.g., at least 300 Hz, at least 600 Hz, at least 900 Hz, at least 1200 Hz, at least 1500 Hz, at least 1800 Hz, at least 2100 Hz, at least 2400 Hz, at least 2700 Hz, at least 3000 Hz, at least 3300 Hz, at least 3600 Hz, at least 3900 Hz, at least 4200 Hz, at least 4500 Hz, at least 4800 Hz, at least 5100 Hz, at least 5400 Hz, at least 5700 Hz, or at least 6000 Hz.

The display device also includes a second photosensor 110. The second photosensor 110 may be positioned within the display 100 behind the front panel 102, such as behind both the front panel 102 and the pixel layer 104, so that it is located in a region to receive and detect ambient light transmitted through the display panel 102. The first photosensor 108 may include a photosensor configured for high speed operation. In some implementations, the second photosensor 110 includes, e.g., a photodiode such as a silicon photodiode. The second photosensor 110 may be configured to sample incident light at a frequency based on an on-off period of a light emitting element in the display device. For instance, the second photosensor 110 may be configured to receive information about an off-period of the light emitting elements of the pixels 106 and to detect light incident on the second photosensor 110 during the off-period.

In some implementations, the first photosensor 108 and the second photosensor 110 are positioned adjacent to one another in the display device 100. In general, pixels in a display device are arranged in a two-dimensional array, in which individual rows are sequentially illuminated. Accordingly, both the first photosensor 108 and the second photosensor 110 may be positioned underneath a same row of the array of pixels 106 so that the first photosensor 108 detects the off-period of the light emitting elements in that row, and the second photosensor 110 can detect ambient light incident during the off-period of the light emitting elements in that row.

Figure 2:
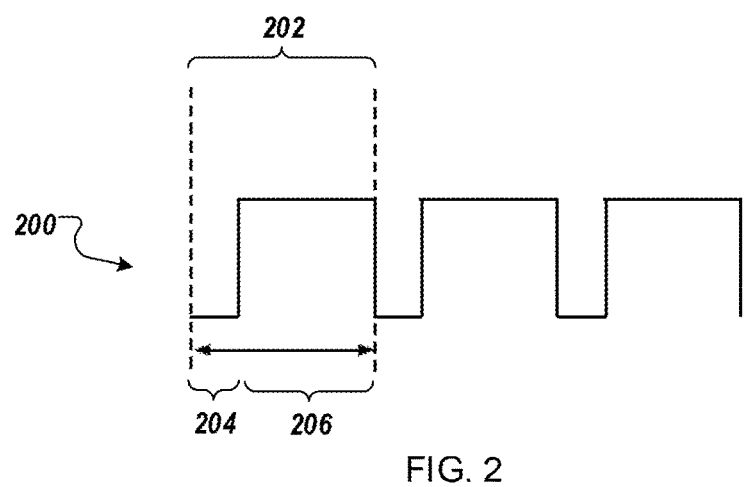
FIG. 2 is a schematic that illustrates an exemplary ambient light sensing device.

FIG. 2 is a schematic that illustrates an exemplary activation signal 200 for a single light emitting element of a display device, such as display device 100. The signal 200 may be provided by a pixel driver element. As shown in FIG. 2, the signal 200 includes a repeating pattern having an overall period 202. Each overall period 202 includes both an off-period 204 and an on-period 206. During the off-period 204 of the signal 202, the value of the signal 200 provided to the light emitting element (e.g., LOW in the example of FIG. 2) turns the light emitting element off such that no light is emitted from the pixel. During the on-period 206, the value of the signal 200 provided to the light emitting element (e.g., HIGH in the example of FIG. 2) turns the light emitting element on such that light is emitted from the pixel.

An ambient light sensing device of the present disclosure is configured to identify the off-period 204 and to measure ambient light incident on the display device during the off-period 204 so that a more accurate determination of ambient light can be made.

Figure 3:
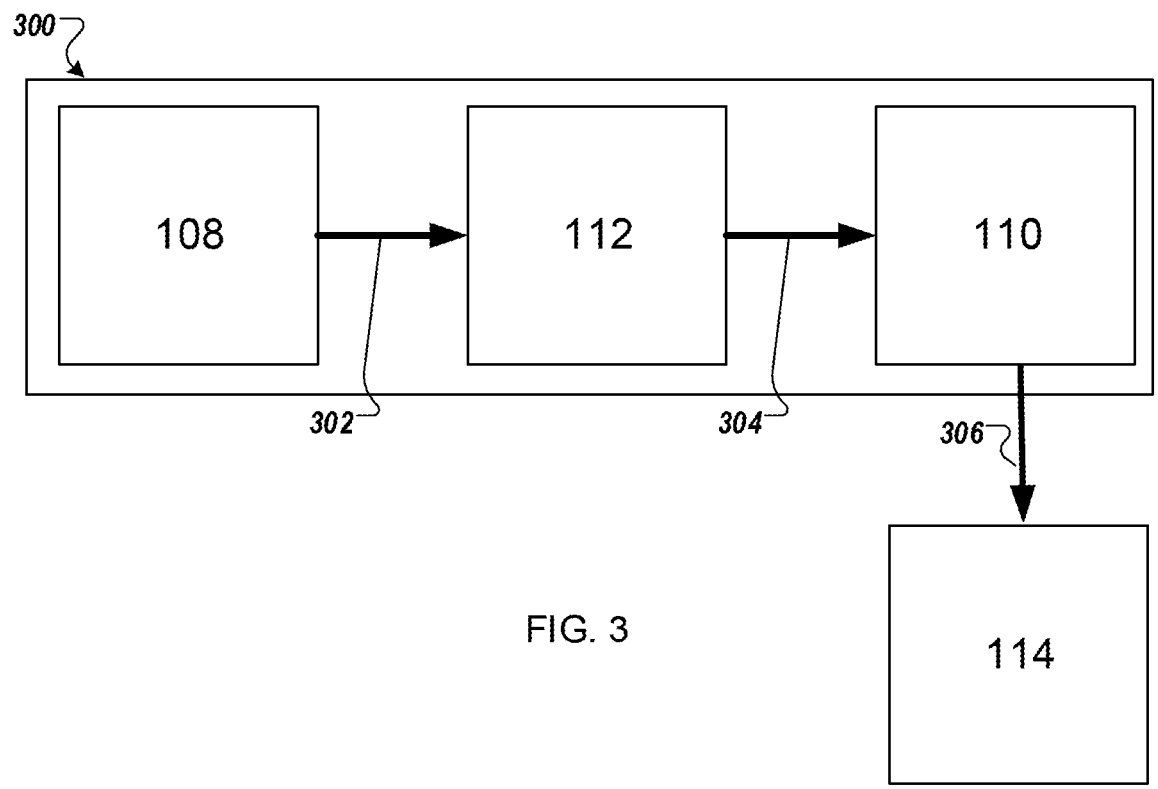
FIG. 3 is a schematic that illustrates an exemplary ambient light sensing device.
Figure 5:
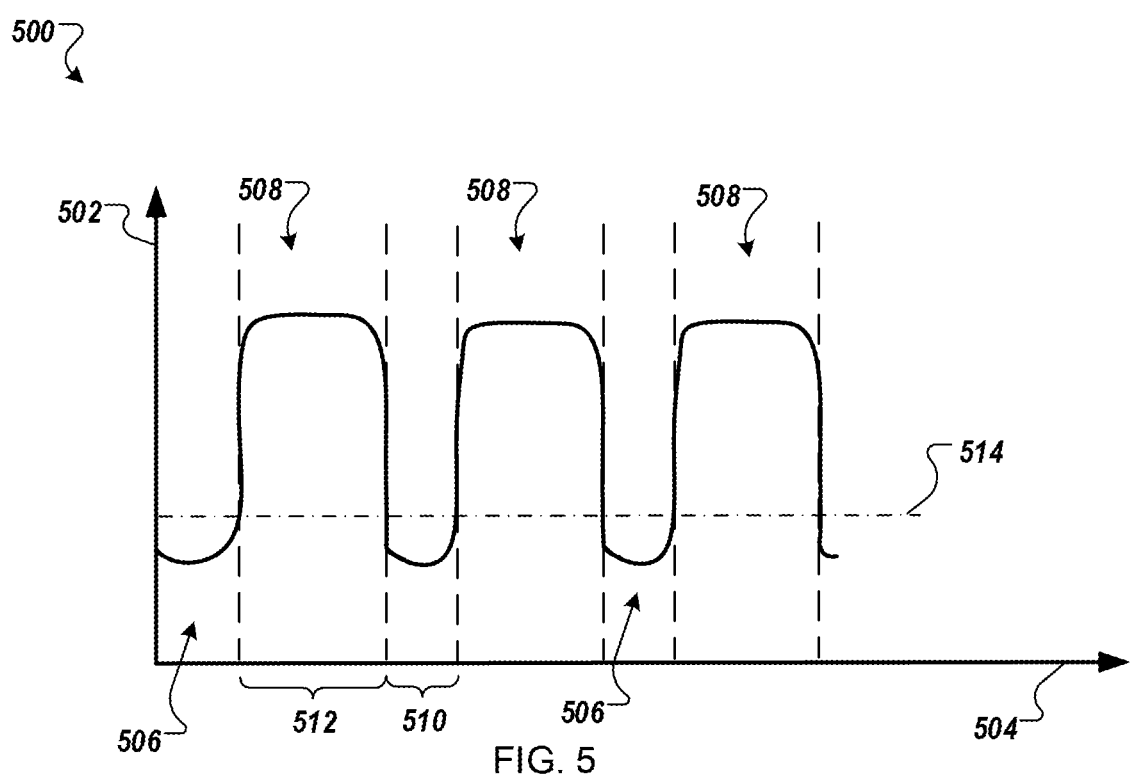
FIG. 5 is a plot of an exemplary signal measured by a first photosensor according to the present disclosure.

For example, FIG. 3 is a schematic of an exemplary ambient light sensing device 300. The ambient light sensing device 300 includes the first photosensor 108 as disclosed herein with respect to FIG. 1. The first photosensor 108 samples incident light on its detector surface during operation of the display device 100. For example, the first photosensor 108 may be configured to sample incident light on its detector surface while a light emitting element of the display device is turned on and off by the activation signal 200. Thus, the photosensor 108 captures incident light during both the off-period 204 and the on-period 206 of the light emitting element. In response to detecting the incident light, the first photosensor 106 outputs a first measurement signal 302. The first measurement signal 302 includes a signal that is indicative of an amount of light detected by the first photosensor 108. For example, FIG. 5 is a plot that illustrates an exemplary measurement signal 500 produced by the first photosensor 108. The measurement signal is plotted as an amplitude (axis 502) versus time (axis 504). The measurement signal 500 follows the periodic turning on and off of the light emitting element. For example, the measurement signal is a repeating pattern that alternates between a high amplitude 508 and a low amplitude 506. The high amplitude 508 occurs during periods of time 512 that correspond to the same time period during which the light emitting element is turned on. The low amplitude 506 occurs during periods of time 510 that correspond to the same time period during which the light emitting element is turned off.

Referring again to FIG. 3, the ambient light sensing device 300 further includes blink detection circuitry 112. Blink detection circuitry 112 is coupled to the first photosensor 108 and configured to receive the first measurement signal 302 from the first photosensor 108. The blink detection circuitry 112 is further configured to derive, from the first measurement signal 302, a blink rate signal indicative of an on-period during which light is emitted by a display (e.g., by a light emitting element of the display) and an off-period during which light is not emitted by the display (e.g., not emitted by a light emitting element of the display).

Figure 4:
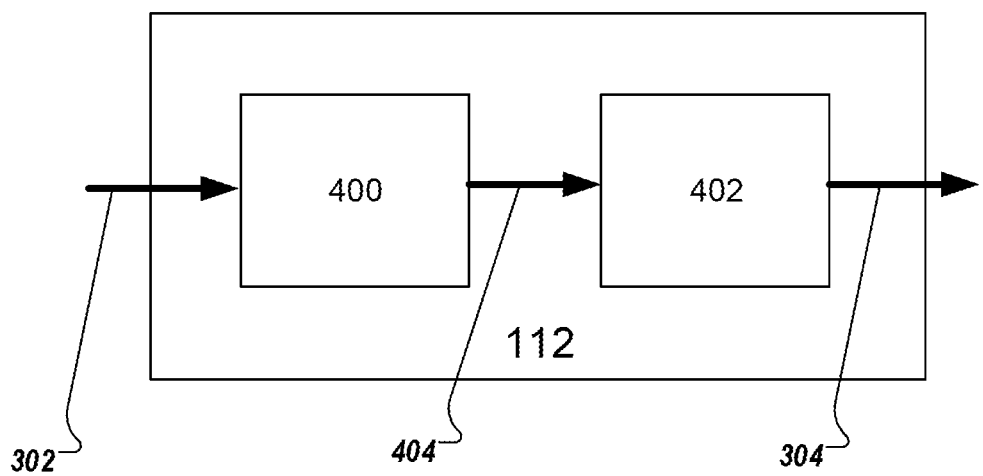
FIG. 4 is a flowchart that illustrates an exemplary process for measuring ambient light.

The blink detection circuit 112 includes several circuit components to analyze the measurement signal 302. FIG. 4 is a schematic that illustrates an exemplary block diagram of a blink detection circuit 112, in which the blink detection circuitry 112 includes an analog front end circuit (AFE) 400. The AFE circuit 400 includes components that perform preconditioning on the measurement signal 302. For example, the AFE circuit 400 may include an amplifier circuit to amplify the measurement signal 302. In some implementations, the AFE circuit 400 may include an analog-to-digital converter to convert the measurement signal 302 from analog to digital representation. The output of the AFE circuit 400 is a preconditioned measurement signal 404.

The blink detection circuit 112 may also include circuit components that derive information about the on-period and off-period of the light emitting elements of the display device from the measurement signal, including, e.g., the preconditioned measurement signal 404. For example, as shown in FIG. 4, the blink detection circuit 112 may include a logic circuit 402. Logic circuit 402 is coupled to the AFE circuit 400 and may include, e.g., a comparator circuit that is arranged to receive the measurement signal 302 (e.g., the preconditioned measurement signal 404). The comparator circuit can be configured to compare the measurement signal 302 (e.g., the preconditioned measurement signal 404) to a first threshold value and output the blink rate signal based on the comparison of the first measurement signal to the first threshold value.

For instance, the measurement signal 500 shown in FIG. 5 may be an example of a preconditioned measurement signal. The comparator circuit (e.g., an operational amplifier) of the logic circuit 402 may compare the signal 500 against a first threshold value 514. The first threshold 514 may be selected by setting the display brightness to a minimum setting, such that the first threshold 514 corresponds to a value along the rising edge of the measurement signal from the minimum value of the measurement signal during the transition of the display from off to on. If the comparator determines that the preconditioned measurement signal has a value greater than the threshold 514, the comparator may output a signal indicative of the display device (e.g., a light emitting element of the display device) being on (i.e., actively emitting light). In contrast, if the comparator determines that the preconditioned measurement signal has a value less than the threshold 514, the comparator may output a signal indicative of the display device (e.g., a light emitting element of the display device) being off. The comparator may repeatedly or continuously evaluate the measurement signal 500 to determine the state of the display device (e.g., the state of a light emitting element of the display device).

Although a single threshold value is illustrated in FIG. 5, multiple threshold values, and thus multiple comparators, may be used by the logic circuit 402. For example, in some implementations, a first comparator may evaluate whether the measurement signal 500 is below a first threshold value. If the measurement signal is below the first threshold value, the first comparator may output a signal indicative of the display (e.g., a light emitting element of the display) being in an off state. A second comparator may evaluate whether the measurement signal 500 is above a second threshold value, in which the second threshold value is greater than the first threshold value. If the measurement signal is above the second threshold value, the second comparator may output a signal indicative of the display (e.g., a light emitting element of the display) being in an on state. If the measurement signal falls between the first threshold value and the second threshold value, the logic circuit 402 may determine that the display (e.g., a light emitting element of the display) is in a transition region between being on and being off.

In some other implementations, the logic circuit 402 includes a slope detection circuit configured to determine a slope of the first measurement signal, e.g., a slope of the preconditioned measurement signal 404, and derive the on-period and the off-period based on the determined slope. For example, in some implementations, the logic circuit 402 includes a differential amplifier circuit that produces an output signal that is a first derivative of an input signal (e.g., the measurement signal 302 or the preconditioned measurement signal 404). The logic circuit 402 may be further configured to analyze the output signal and, based on the value of the output signal, determine the on-period and the off-period of the display (e.g., of a light emitting element of the display). For instance, if the slope is positive and above a predefined first threshold value, the logic circuit 402 may determine that the display (e.g., a light emitting element of the display) is transitioning from an off period to an on period. If the slope is negative and decreasing from a second high value, the logic circuit 402 may determine that the display (e.g., a light emitting element of the display) is transitioning from an on period to an off period. In such cases, the logic circuit may identify the period between the detected negative slope and the detected positive slope as corresponding to the off-period of the display (e.g., of a light emitting element of the display).

The blink detection circuit 112 may output the information derived from the measurement signal 302 (e.g., from preconditioned measurement signal 404) as a blink rate signal 304. The blink rate signal 304 may be a signal that indicates a time period during which a light emitting element of the display is on (e.g., the blink rate signal may include a high value) and indicates a time period during which the light emitting element of the display is off (e.g., the blink rate signal may include a low value). In some implementations, the blink rate signal 304 includes an interrupt signal output by the blink detection circuit 112. Any delays between the blink rate signal 304 and the actual blink period of the light emitting elements may be minimal as the generation of the blink rate signal 304 occurs on a nanosecond time scale and the blink periods of the light emitting elements are on the order of microseconds.

The blink detection circuit 112 may also output a synchronization signal with the blink rate signal 304. The synchronization signal may be tied to the global clock of the device 300 and the display device to ensure proper synchronization of the operations of the different circuit elements of the device 300 and the display 100 in case operations performed by device 300 are performed on a separate chip from operations performed by the display device 100.

Referring again to FIG. 3, the blink rate signal 304 may be passed to the second photosensor 110. The second photosensor 110 is configured to receive the blink rate signal 304 (and, in some implementations, the synchronization signal) and detect light at a rate corresponding to the periodicity of the blink rate signal 304. For example, the second photosensor 110 may turn on and detect incident light when the received blink rate signal 304 is low and may turn off without detecting incident light when the received blink rate signal 304 is high (or vice versa). Since one or more light emitting elements of the display are turned off while the second photosensor 110 detects incident light, the second photosensor 110 measures ambient light on the display rather than light emitted by the display. The second photosensor 110 produces a second measurement signal 306 in response to incident light detected at the second photosensor and transmits the second measurement signal 306 to a control unit 114 of the display device 100. Upon receiving the second measurement signal 306, the control unit 114 may be configured to alter a brightness of the display in response to the second measurement signal 306. For example, the control unit 114 may include circuitry that adjusts an overall brightness level of the light emitting elements of the display in response to the received second measurement signal 306. In some implementations, the control unit 114 may include a data processing apparatus such as a programmable processor, microcontroller or CPU that is configured to execute instructions, e.g., a computer program, stored on computer-readable media such that upon execution of the instructions, the data processing apparatus performs operations including controlling the pixel driver elements in order to adjust the overall brightness according to a lookup table. The lookup table may be stored in computer-readable media such as memory coupled to the control unit 114.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible nontransitory computer storage medium. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

In some cases, the processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

A number of embodiments have been described. Nevertheless, it will be understood that various modifications may be made without departing from the spirit and scope of the invention. Accordingly, other embodiments are within the scope of the following claims.

What is claimed is:

1. A device comprising:
   a first photosensor configured to produce a first measurement signal in response to detecting incident light at the first photosensor;
   blink detection circuitry configured to receive the first measurement signal from the first photosensor and to derive, from the first measurement signal, a blink rate signal indicative of both an on-period during which light is emitted by a display and an off-period during which light is not emitted by the display; and
   a second photosensor configured to receive the blink rate signal from the blink detection circuitry and to detect incident light on the second photosensor during the off-period of the blink rate signal.

2. The device of claim 1, wherein the first photosensor is configured to sample incident light at a frequency of greater than at least 10 times a frame rate of the display.

3. The device of claim 1, wherein the first photosensor is configured to sample incident light at a frequency of greater than 1 KHz.

4. The device of claim 3, wherein the first photosensor is configured to sample incident light at a frequency of greater than 4 KHz.

5. The device of claim 1, wherein the blink detection circuitry comprises a comparator circuit, wherein the comparator is configured to compare the first measurement signal to a first threshold value and output the blink rate signal based on the comparison of the first measurement signal to the first threshold value.

6. The device of claim 1, wherein the blink detection circuitry comprises a slope detection circuit configured to: determine a slope of the first measurement signal; and output the blink rate signal based on the slope of the first measurement signal.

7. The device of claim 1, wherein the second photosensor is configured to:
   produce a second measurement signal in response to incident light detected at the second photosensor; and
   transmit the second measurement signal to a processor of the display.

8. The device of claim 7, comprising the processor, wherein the processor is configured to alter a brightness of the display in response to the second measurement signal.

9. The device of claim 1, wherein the incident light detected at the second photosensor comprises ambient light to the display.

10. A method of detecting ambient light incident on a display, the method comprising:
- detecting incident light at a first photosensor;
- producing, at the first photosensor, a first measurement signal in response to detecting the incident light at the first photosensor;
- transmitting the first measurement signal to blink detection circuitry;
- deriving, at the blink detection circuitry, a blink rate signal from the first measurement signal, wherein the blink rate signal is indicative of both an on-period during which light is emitted by a display and an off-period during which light is not emitted by the display;
- transmitting the blink rate signal to a second photosensor; and
- detecting incident light at the second photosensor during the off-period of the blink rate signal.

11. The method of claim 10, wherein detecting incident light at the first photosensor comprises sampling the incident light at a frequency of at least 10 times a frame rate of the display.

12. The method of claim 10, wherein detecting incident light at the first photosensor comprises sampling the incident light at a frequency of greater than 1 KHz.

13. The method of claim 12, wherein detecting incident light at the first photosensor comprises sampling the incident light at a frequency of greater than 4 KHz.

14. The method of claim 10, wherein deriving the blink rate signal comprises:
- comparing the first measurement signal to a first threshold value; and
- outputting the blink rate signal based on the comparison of the first measurement signal to the first threshold value.

15. The method of claim 10, wherein deriving the blink rate signal comprises:
- determining a slope of the first measurement signal; and
- outputting the blink rate signal based on the slope of the first measurement signal.

16. The method of claim 10, further comprising:
- producing a second measurement signal in response to incident light detected at the second photosensor; and
- transmitting the second measurement signal to a processor of the display.

17. The method of claim 16, further comprising:
- altering, by the processor, a brightness of the display in response to the second measurement signal.

18. The method of claim 10, wherein the incident light detected at the second photosensor comprises ambient light to the display.

* * * * *